United States Patent Office 3,417,035
Patented Dec. 17, 1968

3,417,035
TRIHYDROPOLYFLUOROALKYLENE GLYCIDYL ETHERS, METHODS FOR MAKING SAID ETHERS, AND POLYMERS AND COPOLYMER OF SAID ETHERS
Otto C. Elmer and Charles E. Greene, Akron, and Arden E. Schmucker, Hartville, Ohio, assignors to The General Tire & Rubber Company, Akron, Ohio, a corporation of Ohio
No Drawing. Filed Mar. 8, 1965, Ser. No. 438,060
8 Claims. (Cl. 260—2)

ABSTRACT OF THE DISCLOSURE

Trihydropolyfluoroalkylene glycidyl ethers having the general formula

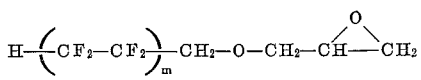

where $m$ is an integer of from 1 to 7 are prepared by the reaction of a trihydropolyfluoroalcohol of the general formula $H\text{-}(CF_2\text{---}CF_2)_m CH_2OH$ where $m$ is an integer of from 1 to 7 and an epihalohydrin,

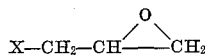

where $x$ is chlorine or bromine in an aqueous alkaline system. The resulting monomers can be homo-polymerized, or copolymerized with other saturated or unsaturated epoxide monomers, using suitable metal containing catalysts to yield polymeric materials having improved resistance to solvents, oils, chemicals and water.

---

This invention relates to fluorine containing polyethers, and more particularly to monomers and polymers prepared from a hydrofluoroalcohol and an epihalohydrin.

It is an object of the present invention to provide vicinal epoxy ether monomers and polymers thereof and a method for their preparation, which polymers are resistant to chemicals, oil, solvents and water.

These and other objects will become apparent from the following description of the invention and the examples.

According to the present invention, it has been discovered that new and useful fluoroglycidyl ether polymers (including copolymers, terpolymers, etc.) which have improved resistance to solvents, oil, chemicals and water, are prepared by polymerizing a trihydropolyfluoroalkylene glycidyl ether monomer of the general formula:

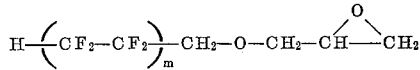

where $m$ is an integer of from 1 to 7, in the presence of a suitable metal-containing catalyst complex.

The trihydropolyfluoroalkylene glycidyl ether monomers of the invention are prepared by reacting a trihydropolyfluoroalchohol of the general formula:

where $m$ is an integer of from 1 to 7, and an epihalohydrin of the general formula:

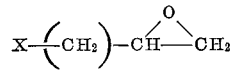

where X is chlorine or bromide in an aqueous, alkaline system.

These trihydropolyfluoroalcohols can be prepared by heating a completely halogenated fluoroethylene with an alcohol which is free of non-aromatic unsaturation and in which the carbon atom bearing the hydroxyl group has directly attached thereto a hydrogen atom, i.e., a primary or secondary alcohol.

In a typical example of the present invention, trihydropolyfluoroalkylene glycidyl ether monomers are prepared by combining the mentioned trihydropolyfluoroalcohols with epihalohydrin in water under alkaline conditions (i.e., at a minimum pH of 7.0). The alcohol and the epihalohydrin are in a molar ratio of about 1.0:0.05 to 1.0:20. Examples of desirable alkaline materials are bases such as potassium hydroxide, sodium hydroxide, ammonium hydroxide, magnesium hydroxide and the like. The reaction mixture is agitated during the course of the reaction, preferably by stirring. The reaction product, which is fractionally distilled, comprises polymerizable trihydropolyfluoroalkylene glycidyl ethers which are clear liquids. Yields of the trihydropolyfluoroalkylene glycidyl ether of about 65 percent are obtained.

Polymerizable monomer, trihydropolyfluoroalkylene glycidyl ether, a catalyst and a solvent for the polymerizable monomer are added to a reactor at room temperature and heat applied as necessary to effect polymerization.

Catalyst, for the present invention, should produce a polymer of a molecular weight high enough to furnish a millable, rubbery material that can be processed by conventional means. However, when liquid polymers are produced, they can be mixed with fillers and curatives to give a useful product.

A suitable metal-containing catalyst complex is diethyl zinc and water which can be prepared by cooling a solution of diethyl zinc in a solvent and adding water either alone or in an organic solvent, while caintaining the temperature within a range of about $-15°$ C. to $+15°$ C. The resulting product can be dried and used to polymerize the polymerizable monomer.

Another useful catalyst is a trialkyl aluminum, acetylacetone and water complex, preferred of which is a triisobutyl aluminum, acetylacetone, and water catalyst complex. The triisobutyl aluminum is chelated with acetylacetone which is capable of forming a nucleus by coordination of its unshared elections with the aluminum atom. The ratio of the acetylactone to the hydrocarbon aluminum compound is in the range of about 1.0 to about 1.5 moles per mole of aluminum.

The effects of the chelated aluminum are enhanced by reacting the aluminum chelates with water in a molar ratio of about 1.0 mole water per mole of triisobutyl to about 1.5 moles of water per mole of triisobutyl aluminum. Amounts of water as high as 2 moles of water to each 1 mole of aluminum compound may be used. However, little or no improvement is ascertained when the ratio of water to triisobutyl aluminum exceeds a 2 to 1 ratio. The mole ratio is preferably between about 0.2:1 and 1:1.

To obtain a more stable diethyl zinc and water catalyst for polymerization, an organic material may be added to the catalyst as a complexing agent. Eaxmples of organic materials for use in treating the catalyst are ethers, preferable of which are the aliphatic saturated monoethers such as bis-($\beta$-methoxyethyl)ether or digylme, ethylene glycol dimethyl ether, or triethylene glycol dimethyl ether. Other substances such as butyl Cellosolve may also be used to stabilize the catalyst.

The amount of catalyst may vary from 0.0001 to 10.0 weight percent, preferably from 0.001 to 5.0 weight percent, based on monomer, or monomers, the most preferable range being from 0.005 to 0.5 weight percent.

Examples of solvents which can be present in the reactor along with the catalyst and the trihydropolyfluoroalkylene glycidyl ether monomer are toluene, benzene, heptane, octane, xylene and trichloroethylene. Preferably, for easy removal, the solvent should be volatile, having a boiling point of below 100° C.

Polymerization is advantageously conducted in an autoclave and in an inert or non-oxidizing atmosphere at a temperature of about 0° C. to 150° C. The atmosphere preferably comprises such inert gases as nitrogen, etc. or non-oxidizing vapor of a solvent or monomer. Moisture is excluded from the polymerization as the presence of moisture will kill the catalyst and thereby inhibit polymerization.

In accordance with the present invention, polymerizable monomer, as aforementioned, of from 2 to 20 carbon atoms and containing a ring of 2 carbon atoms and one oxygen atom, which ring opens during polymerization to form a polyether, can be polymerized alone or in admixture with one or more polymerizable comonomers having from 2 to 20 carbon atoms and one or more oxygen-carbon rings in which the oxygen atom is joined with 2 to 3 carbon atoms in the ring, which ring also opens and polymerizes to form a polyether.

Polymerizable comonomers are of the general formula:

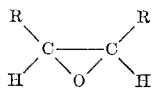

where each R can be hydrogen or a monovalent hydrocarbon radical.

Examples of R include alkyl radicals, as methyl, ethyl or propyl; alkenyl radicals, such as butenyl, hexenyl or octenyl, aryl radicals, such as phenyl; alkaryl radicals, such as tolyl, dimethyl phenyl or ethyl phenyl; aralkyl radicals such as benzyl, 2-phenylethyl or 3-phenyl-propyl; cycloalkyl radicals, such as cyclopropyl or cyclobutyl; or cycloalkenyl radicals such as cyclohexenyl. R may be the same or different. It has been found that certain substituted derivatives may also be used, such as chloride, alkoxy and/or ester substituted derivatives.

Examples of useful polymerizable comonomers which may be polymerized in admixture with the fluoro-containing monomer are such saturated and unsaturated polymerizable monomers as methyl glycidyl ether, allyl glycidyl ether, ethylene oxide, propylene oxide, butene monoxide, isobutylene oxide, styrene oxide, 1,2-diisobutylene oxide, 2,3-diisobutylene oxide, phenyl glycidyl ether, ethyl glycidyl ether, vinyl cyclohexene monoxide, nitroethylene oxide, butadiene dioxide, 3-methyl-3, 4-epoxy butene-1, butadiene monoxide, vinyl cyclohexene dioxide, glycidyl methacrylate, epichlorohydrin, dicyclopentadiene monoxide, limonene dioxide, isoprene monoxide, diglycidyl ether of pentanediol, bis 1,1'-(3,4-epoxy-6-methyl phenyl) methyl formate, 1,2-pentylene oxide, 2,3-hexylene oxide, 3,4-hexylene oxide, 3-ethyl-2,3-pentylene oxide, cyclopentene oxide, cyclohexene oxide, benzylethylene oxide, 1,2-pentene oxide, 1-epoxy ethyl-3,4-epoxy cyclohexane, isopentene oxide, 1,2-heptene oxide, isoheptene oxide, 1,4-dichloro-2,3-epoxy butane, allyl epoxy stearate. Mixtures of these polymerizable monomers can be used in combination with the polymerizable, fluoro-containing monomer. Of these materials it is preferred to use methyl glycidyl ether, allyl glycidyl ether and propylene oxide. The ratio of monomers generally varies from as high as 85% to 95% fluoro-containing monomers, when superior oil, chemical, solvent and water resistance are desired, to as low as 10% to 20% when such resistance is not of prime importance.

The average molecular weight of the polymers of this invention are from at least about 50,000 to 10,000,000 or higher, which corresponds to an intrinsic viscosity in benzene at 25° C. of from about 1.0 to 10. Copolymers of the invention may contain repeating units in a random arrangement or may contain block arrangements of repeating units. In these fluoro-containing polymers the saturated, fluorocarbon chain is a pendant group that imparts novel characteristics to the polymer due to the high degree of chemical inertness and thermal stability of the pendant group, since it lacks affinity for either water or oil. Besides oil and water resistance, the pendant fluorocarbon groups produce a polymer that has good physical properties, including low temperature flexibility and ozone resistance. With regard to oil resistance the cured polymers of this invention are proportional qualitatively to such materials as Neoprene, polyesters, cellulose and polyamides. The cured polymers are used in gaskets, bushings, seals, hose and fuel storage vessels.

The polymers may be compounded with the usual rubber and resinous compounding materials, such as curing agents, antidegradants, fillers, extenders, fire resistant materials, etc. Examples of useful materials that can be compounded with the rubbers are zinc oxide, stearic acid, sulfur, carbon black, polyisoprene, butadiene-styrene, nitrile rubber, acrylonitrile styrene resin, polyvinyl chloride, and mixtures thereof.

The curing of the polymeric compounds of the present invention is normally conducted at from about 200° to 400° F. for from 20 to 30 minutes, and if completely saturated may be brought about by heating the polymer with a peroxide or other free radical donor and a cocuring agent such as sulfur or a diolefin (e.g., low molecular weight dimers and trimers of butadiene). The unsaturated copolymers and terpolymers are cured with accelerated sulfur cures. The polymers may also be partially cured by maintaining the polymer at a temperature of from about 200° to 275° C. for from 15 to 20 minutes to effect the partial cure.

The term polymer is used herein and in the claims in the generic sense to include copolymer, terpolymer, etc. as well as homopolymers.

The invention will be best understood with reference to the following examples which are given for purpose of illustration only, and are not to be interpreted as limiting the invention:

EXAMPLE I

A mixture of 140 grams of KOH, 400 cc. of $H_2O$ and 400 grams of epichlorohydrin was cooled to 20° C. and 264 grams of 1,1,3-trihydrotetrafluoro-1-propanol were added. Upon addition of the alcohol, the temperature rose to 40° C. and was maintained there. The reaction product separated into two layers, an organic lower layer and an aqueous upper layer. The reaction was essentially completed when one cc. of the aqueous phase titrated with 0.4 cc., or less, of 0.1 N HCl to the neutral point. The two phases were separated; the lower organic layer was washed 3 times with 300 ml. portions of water, dried with anhydrous $Na_2SO_4$ and fractionated in vacuo. The main fraction, which was 1,1,3-trihydrotetrafluoro-1-propyl glycidyl ether monomer, boiled at 55° C. at 1 mm. of Hg, had a refractive index $n_D^{25}$, of 1.3540, and a fluorine content of 53.3% (52.9% calculated). The slight discrepancy between the fluorine actually found and the calculated fluorine content was attributed to experimental error.

EXAMPLE II

The 1,1,3-trihydrotetrafluoro-1-propyl glycidyl ether monomer of Example I was polymerized using the following materials:

| Materials: | Amounts |
|---|---|
| 1,1,3-trihydro-tetrafluoro - 1 - propyl glycidyl ether monomer _____g__ | 61.00 |
| Dry benzene solvent _____g__ | 66.00 |
| $H_2O$ _____cc__ | 0.084 |
| Acetylacetone _____cc__ | 0.56 |
| Triethyl aluminum _____cc__ | 1.80 |

The above components were charged, in the sequence listed, to a dry, nitrogen-flushed, one-pint bottle and tumbled in a bath at 80° C. for 21 hours. The solvent and excess monomer were removed from the polymer sample by placing them in a vacuum oven at 50° C. The polymer had a Mooney viscosity (ML—4) of 20. It contained 39.1% fluorine (40.4% calculated).

The polymer was cured in the following manner:

| Components: | Parts by weight |
|---|---|
| The above prepared polymer | 100.0 |
| ISAF Black | 60.0 |
| Stearic acid | 0.5 |
| Dicumyl peroxide (Di-Cup 40C) | 15.0 |
| Sulfur | 0.6 |
| Ethylene glycol dimethacrylate (SR-206) | 4.0 |

The mixture was cured for 20 and 30 minutes at 300° F. The following solvent swelling properties were obtained:

| Volume swell in— | 20 minutes, percent | 30 minutes, percent |
|---|---|---|
| Toluene, room temperature | 37 | 35 |
| Fuel "C," room temperature | 1.5 | 6.1 |
| ASTM No. 3, oil, 202° F | −6 | −3 |

EXAMPLE III

The following components were charged to a dry, nitrogen-flushed, 12 ounce glass bottle reactor in the following sequence:

| Materials: | Amount |
|---|---|
| 1,1,5-trihydro - octafluoro - 1 - pentyl - glycidyl ether monomer (FGE) g | 60.00 |
| Allyl glycidyl ether monomer (AGE) g | 2.80 |
| Dry benzene solvent g | 60.00 |
| H₂O cc | 0.08 |
| Acetylacetone cc | 0.48 |
| Triethyl aluminum cc | 1.28 |

The polymerization bottle containing the above components was immersed in an 80° C. polymerization bath and rotated for 20 hours. The resultant product was vacuum stripped at 60° C. The product of this polymerization was 63 grams of an elastomeric fluoroglycidyl ether/allyl glycidyl ether copolymer.

The above unsaturated polymer was cured using:

| Components: | Parts by weight |
|---|---|
| Copolymer as prepared above | 100.00 |
| ISAF black | 50.00 |
| Stearic acid | 1.00 |
| Zinc oxide | 3.00 |
| 2,2'-methylene bis(4-methyl-6-butyl phenol) antioxidant | 0.50 |
| Nickel dibutyl dithiocarbamate (NBC-1) | 1.00 |
| Sulfur | 2.50 |
| n-Cyclohexyl - 2 - benzothiazole sulfenamide (Santocure) | 1.65 |

The polymerization mixture was cured at 300° F. for 65 minutes. The following swelling properties were obtained. A comparison was made with Neoprene and the results listed.

SWELLING OF CURED FGE/AGE COPOLYMERS

| Solvent | FGE/AGE, percent | Neoprene Swell Ratio* |
|---|---|---|
| ASTM No. 3 oil | −6 | |
| ASTM Fuel "C" (50% toluene 50% isooctane) | 22.5 | 0.24 |
| Toluene | 19 | 0.12 |

*The Neoprene swell ratio is defined as SP_A/SP_N where SP_A is the equilibrium volume swell in a given solvent of polymer A and SP_N is a similar value obtained for Neoprene in the same solvent.

EXAMPLE IV

The following were charged to a dry, nitrogen-flushed, glass bottle reactor:

| Materials: | Amounts |
|---|---|
| Methyl glycidyl ether g | 75.00 |
| 1,1,5-trihydro-octafluoro - 1 - pentyl - glycidyl ether g | 47.00 |
| Allyl glycidyl ether g | 7.60 |
| Phenyl-betanaphthlamine g | 0.65 |
| Nitrobenzene cc | 0.11 |
| Dry benzene g | 260.00 |
| H₂O cc | 0.20 |
| Acetylacetone cc | 1.115 |
| Triethyl aluminum cc | 3.00 |

The molar charge ratio was 79% methyl glycidyl ether, 15% trihydropolyfluoroalkylene glycidyl ether and 6% allyl glycidyl ether. The above components, sealed in a polymerization bottle, were immersed for 40 hours in an 80° C. polymerization bath. The resultant polymer was vacuum stripped of excess monomer and solvent at 60° C. The resultant 84 grams of elastomeric terpolymer containing 16% fluorine had a raw Mooney viscosity (ML–4) of 10.

The polymer was cured as in Example III and the following swelling properties were obtained. The polymers are compared with neoprene, subjected to the same solvent swelling tests:

| Solvent | Percent swell | Percent Neoprene swell |
|---|---|---|
| H₂O, room temperature | 9 | 2 |
| H₂O, 212 F | 3 | 6 |
| ASTM No. 3 oil | 4 | 88 |
| Test Fuel (50% aromatic) | 86 | 174 |
| Toluene | 205 | 224 |

It is to be understood that in accordance with the provisions of the patent laws, various modifications can be made in the methods, procedures, compositions and products of the present invention without departing from the spirit of the same.

What is claimed is:

1. A compound having the formula:

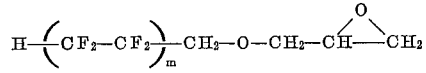

where $m$ is an integer of from 1 to 7.

2. A polymer of a trihydropolyfluoroalkylene glycidyl ether monomer of the formula:

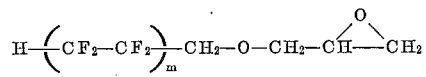

where $m$ is an integer from 1 to 7, which polymer has a molecular weight of at least 50,000 to 10,000,000, wherein said monomer is polymerized through the epoxide linkage to form a polyether.

3. A copolymer of an unsaturated epoxide and of a trihydropolyfluoroalkylene glycidyl ether monomer of the formula:

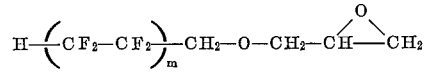

where $m$ is an integer from 1 to 7, which polymer has a molecular weight of from about 50,000 to 10,000,000, wherein said unsaturated epoxide and said trihydropolyfluoroalkylene glycidyl ether monomers are polymerized through their epoxide linkages to form a polyether, and wherein said unsaturated epoxide has up to a total of 20 carbon atoms and has a ring of two carbon atoms and one oxygen atom.

4. A terpolymer of a saturated epoxide, an unsaturated epoxide and of a trihydropolyfluoroalkylene glycidyl ether monomer of the formula:

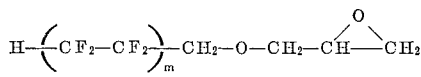

where $m$ is an integer from 1 to 7, which polymer has a molecular weight of from about 50,000 to 10,000,000, wherein said saturated epoxide, said unsaturated epoxide and said trihydropolyfluoroalkylene glycidyl ether monomers are polymerized through their epoxide linkages to form a polyether, wherein said saturated epoxide is an epoxide other than said glycidyl ether monomer, and wherein each of said saturated epoxide and said unsaturated epoxide has up to a total of 20 carbon atoms and has a ring of two carbon atoms and one oxygen atom.

5. A copolymer of a saturated epoxide and of a trihydropolytrifluoroalkylene glycidyl ether monomer of the formula:

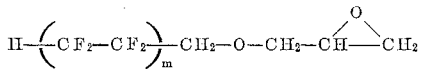

where $m$ is an integer from 1 to 7, which polymer has a molecular weight of from about 50,000 to 10,000,000, wherein said saturated epoxide and said trihydropolyfluoroalkylene glycidyl ether monomers are polymerized through their epoxide linkages to form a polyether, and wherein said saturated epoxide is an epoxide other than said glycidyl ether monomer, has up to a total of 20 carbon atoms and has a ring of two carbon atoms and one oxygen atom.

6. The polymer of claim 3 wherein said unsaturated epoxide is allyl glycidyl ether.

7. The polymer of claim 5 wherein said saturated epoxide is selected from the group consisting of methyl glycidyl ether and propylene oxide.

8. A method of preparing a trihydropolyfluoroalkylene glycidyl ether monomer which comprises reacting a trihydropolyfluoroalcohol with an epihalohydrin, where the molar ratio of said alcohol to said epihalohydrin is from about 1.0:0.05 to 1.0:20, where the reaction is conducted in aqueous alkaline media, where the alcohol has the general formula $H\text{-}(CF_2\text{-}CF_2)_m CH_2OH$ where $m$ is an integer of from 1 to 7, and where the epihalohydrin has the general formula

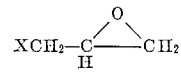

where X is selected from the group consisting of chlorine and bromine.

References Cited

UNITED STATES PATENTS 3,135,705   6/1964   Vandenberg _____ 260—2

WILLIAM H. SHORT, *Primary Examiner.*

T. E. PERTILLA, *Assistant Examiner.*

U.S. Cl. X.R.

260—348, 348.6, 88.3, 887, 898, 899